Jan. 24, 1956 V. A. JEANNOT 2,732,491
TESTING INSTRUMENT ASSEMBLY
Filed July 14, 1949 2 Sheets-Sheet 1
Fig. 1.
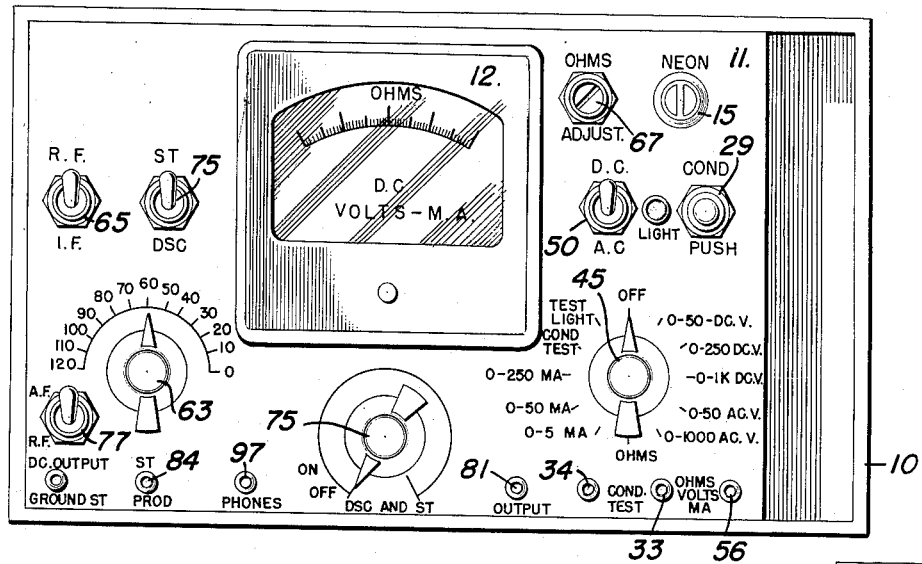
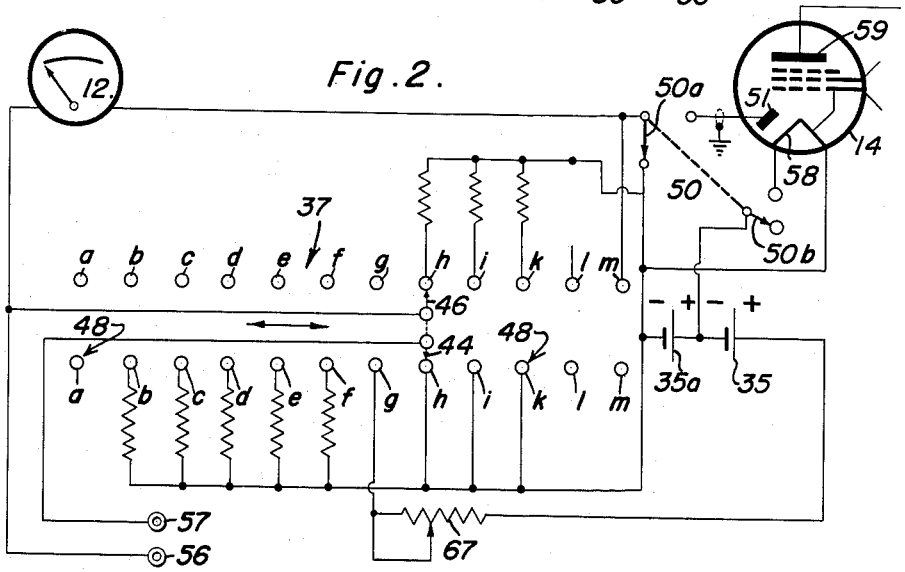
Fig. 2.
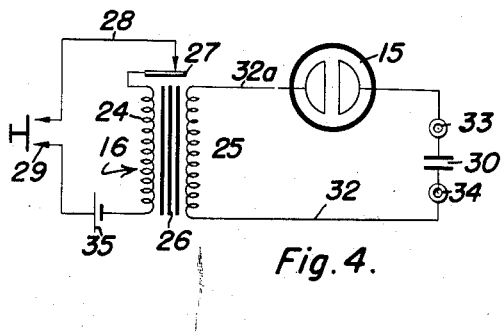
Fig. 4.
Inventor
Vincente A. Jeannot
By Clarence A. O'Brien
and Harvey B. Jacobson
Attorneys

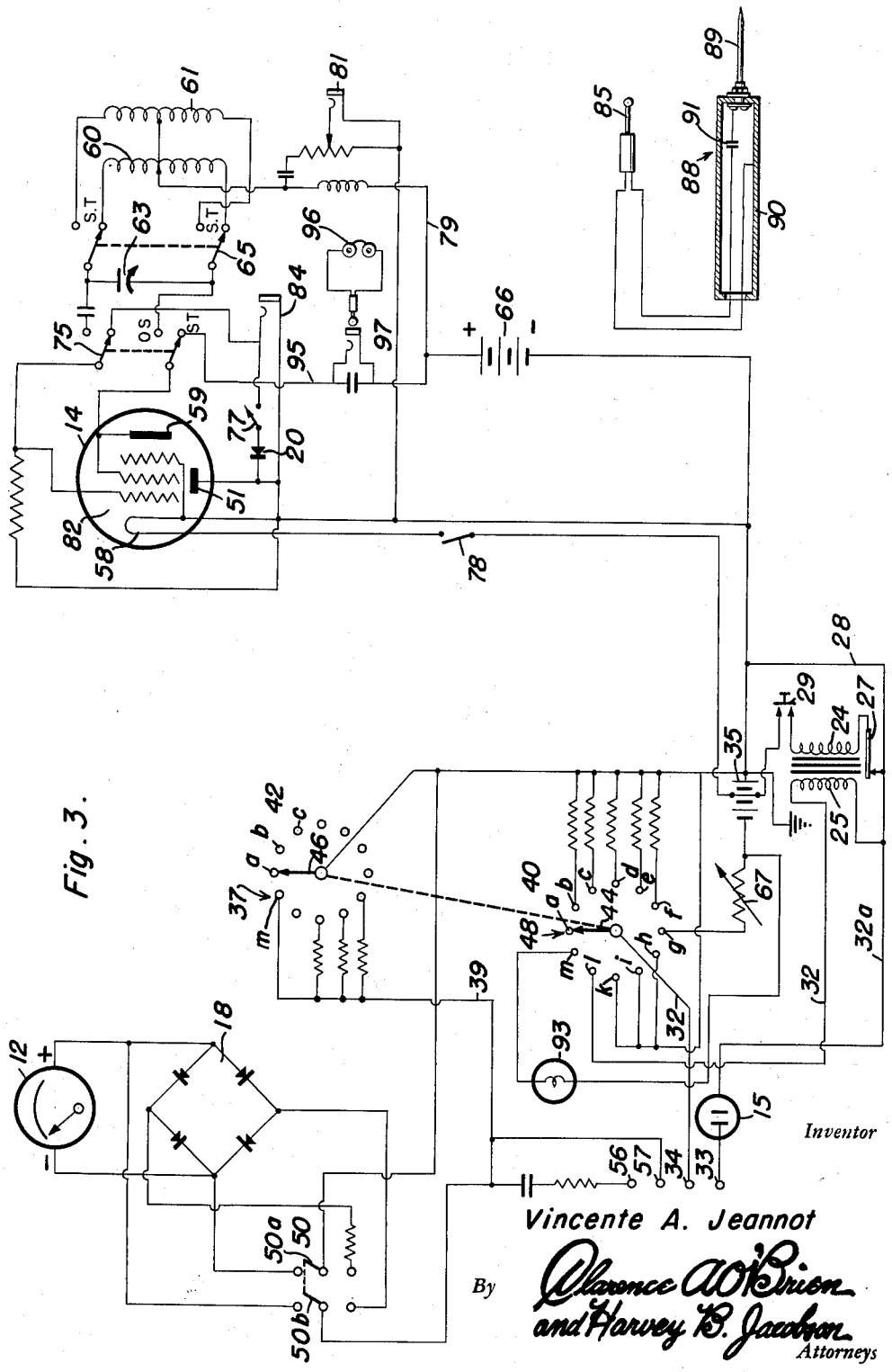

United States Patent Office 2,732,491
Patented Jan. 24, 1956

2,732,491
TESTING INSTRUMENT ASSEMBLY
Vicente A. Jeannot, New York, N. Y.
Application July 14, 1949, Serial No. 104,691
11 Claims. (Cl. 250—20)

This invention relates to testing instruments and more particularly to such testing instrument assemblies which are used in connection with radio or television apparatus and which contain the necessary equipment to measure the voltage, amperage, or resistance of a circuit used in an apparatus, to produce oscillations, to trace circuits by means of oscillatory signals and to test condensers.

It is the principal object of the invention to provide a testing instrument assembly which, while performing all the testing operations which are required for the testing and repair of radio and television apparatus, permits to reduce the space occupied, the weight of the equipment and the cost of the testing assembly and to simplify the manipulation of the testing assembly to a certain extent.

A further object of the invention consists in providing a testing assembly which may be carried by the service man on an outside servicing call and which will permit to apply practically all the tests which the service man usually applies on the testing stand in his shop.

A further object of the invention consists in providing a testing instrument assembly which may be used for measuring purposes and for a number of tests, using largely the same instrumentalities, while changing over from connections used for measurement to those used for testing and the change of connections necessary when shifting from one test to another is merely obtained by the operation of a small number of switches.

A further object of the invention consists in using a simplified and novel method for the testing of condensers according to which condenser defects, leakages or other failures are indicated by visual means.

A further object of the invention consists in providing a testing assembly in which oscillation tests and signal tracing tests may be carried out in addition to other tests by means of a signal oscillator tube provided with a plurality of output circuits which permit the generation of oscillations at various frequencies and also the connection of a test prod with said electronic tube which connection produces an audible signal by virtue of the values of the components connected with the electronic tube without signal modulation.

It is a further object of the invention to provide a testing assembly with which oscillation tests and signal tracing tests may be carried out using a single oscillator tube provided with a plurality of output circuits, the selection of a particular method being produced by switches arranged in series in the output and grid circuits of the electronic tube.

Further and more specific objects will be explained in the detailed specification.

The invention is illustrated in the accompanying drawing showing one embodiment of the same and a modification thereof by way of example. It is however to be understood that the example shown is selected in order to illustrate the principle of the invention and the best modes of carrying this principle into effect. Further modifications of the embodiment which is shown in the drawings are however not necessarily to be considered as departures from the essence of the invention.

In the drawings:

Figure 1 is an elevational front view of the instrument panel;

Figure 2 is a diagram of that part of the instrument which is mainly used for carrying out measuring operations, a modification of the embodiment illustrated in Figure 3 being shown;

Figure 3 shows a diagram of the components and connections used in the instrument;

Figure 4 is a diagram illustrating the principle of the condenser checking system.

As has been explained above the invention has mainly the purpose to provide a handy combination testing unit for service men and other persons who have to conduct a relatively large number of tests of a varying nature.

As shown in the drawings the testing instrument comprises essentially means for testing condensers, means for producing test signal oscillations, means for signal tracing and means for measuring or indicating voltages, current intensities and resistances and it also comprises means for indicating the polarity of a current.

A testing unit in accordance with the invention may be housed in a small portable casing 10. The instrumentalities which are used comprise essentially a milliammeter for D. C. currents 12 which is provided with a multimeter scale, so-called, for indicating volts, amperes and ohms, a pentode or another multielectrode tube 14, a neon lamp 15, a vibrator 16, a rectifier 18 and a number of resistances, coils, transformers, jacks and switches to be described in connection with the circuits. A crystal detector 20 may either be fixedly mounted within the instrument or alternatively may be mounted in a test prod 88 to be connected with the instrument which is mainly used for the signal tracing of circuits.

The instrument will best be understood by describing the circuits and their use for testing purposes.

For the testing or checking of condensers a special circuit is used which is shown in a diagrammatic and simplified form in Figure 4. This condenser checking circuit permits to check a paper or mica condenser and to determine whether the condenser is short circuited or is in other respects defective. The condenser checking system comprises the vibrator 16 which consists of a primary coil 24 and of a secondary coil 25 both wound around a magnetic core arranged in front of a vibrating armature 27 which is arranged in the circuit 28 of the primary winding 24. The circuit 28 also contains a switch 29 which is preferably in the form of a push button switch and which is mounted on the panel 11 of the instrument (Figure 1). The vibrator circuit also comprises some of the cells 35 of a dry cell battery 35, 35a.

In the secondary circuit 32 of the secondary coil 25 a neon lamp 15 is arranged. This circuit leads to the jacks or female connection members 33, 34 both of which are mounted on the panel 10 and are marked "condenser tests" on this panel. The condenser 30 to be tested is connected to pin jacks or plugs which are inserted into the jacks 33 and 34.

The checking is done visually by observing the neon lamp 15. It will be clear that the condenser is charged upon each interruption of the current in the primary upon closing of the switch 29 by the operator. Thus a high voltage high frequency secondary current is produced in the circuit 32 by means of the secondary 25. The current produced in the secondary coil charges the condenser 30 and produces a glowing of one of the electrodes of the neon lamp 15. When the condenser 30 now discharges itself it produces a glow of the second electrode of the neon tube. The charging and discharging of the condenser therefore causes the two electrodes of the neon lamp to glow in rapid succession but on account of the rapidity with which the charge and discharge succeed each other the two electrodes seem to glow simultaneously. The glowing of both electrodes of the neon tube therefore indicates that the condenser operates normally. If however a short circuit of the condenser would have occurred merely a charging circuit would act on the neon tube and therefore only the left hand electrode in Figure 4 would glow.

The above described arrangement may also be used for testing the polarity of a current or for testing a current to see whether it is a direct or an alternating current. For such a test the terminals of the circuit in which the current to be tested flows are connected with the two terminals or jacks 33, 34. When the plugs connected with the said circuit have been inserted into the jack the neon tube is observed. If only one of the electrodes shows a glow the current is a direct current, if both electrodes glow the current is an A. C.

In order to test the polarity test plugs are inserted into the jacks or female plugs and are applied to the external D. C. voltage the polarity of which has to be determined. The neon tube is observed and it is noted which electrode of the neon lamp glows when the positive pole of a known source of current is connected with the terminals. The polarity of the unknown D. C. current is the same if the same electrode of the neon tube glows.

Referring now to Figure 3 of the drawing illustrating the connections of the instrument it will be noted that the jack or female plug 34 with which the condenser to be tested is connected on one side is joined to the movable contact 44 of a switch 40, while contact 33 is connected with the neon tube 15 and with the secondary coil 25 the other end of which is connected with one of the fixed contacts of the switch 40. The switch 40 is ganged with the switch 42 and is operated by manipulating the handle 45 on the panel 11 of the casing. For the purpose of condenser testing this handle must be placed in the position marked "condenser testing" in Figure 1 whereby the movable switch arm 44 of switch 40 is placed on the contact 1 connected with wire 32 leading to the secondary coil 25.

The ganged switches 40, 42 are preferably arranged on two decks with two rotatable arms 44, 46 turning at the same time over fixed contact sets and moved by the handle 45. These switches serve the purpose of cooperating with the milliammeter 12 in order to determine its range and the type of measurement which has to be made. The milliammeter 12 may be connected with the rectifier 18 which is preferably a copper oxide rectifier and which may be connected as shown in Figure 3. However, it is also possible to use the electronic tube 14 as a rectifier as shown in Figure 2 which in this respect illustrates a modification. The electronic tube 14 in this case is a dual tube, such as tube 1S5, having a diode which may be connected with the milliammeter for the purpose of rectification.

Figure 2 in all other respects shows the multi-meter connections, so-called, which may be arranged in order to carry out measurements in different ranges and measurements of different electrical values. In order to obtain a better illustration in Figure 2 the fixed contacts 37 of the switch 42, and the fixed contacts 48 of the switch 40 are arranged in a straight line in the diagram although they are arranged in a circle around the axis of rotation of the rotating arms 44, 46 of the switches in the instrument. The arms 44, 46 are movable along the series of fixed contacts in Figure 2.

The fixed contacts are connected with resistances of a definite value which may be connected in series to the small dry cell battery 35, 35a, some cells of which are also used in connection with the condenser testing arrangement, as aforedescribed. For instance, of the series of contacts cooperating with switch arm 44 contact $a$ may be the "off" contact, contacts, $b$, $c$, $d$ are connected in such a way that voltage measurements up to 50 volts, up to 250 volts, up to 1000 volts D. C. may be made. Contacts $e$, $f$ are wired for the measurement of voltage up to 50 volts, and up to 1000 volts A. C. Contact $g$ is connected with an adjustable resistance 67 of say 3500 ohms in series with the battery cells 35, 35a so that the instrument may function as a series ohmmeter. Contacts $h$, $i$, $k$ are connected for measuring up to 5 ma. D. C. up to 50 ma. D. C. and 250 ma. D. C., respectively, while the contacts $l$ and $m$ are used for condenser testing and for a continuity test to be described below.

The switch 50 is arranged for the purpose of connecting the milliammeter either directly with the set of resistances determining the measuring range and with the jacks connected with the circuit to be measured, a connection which is made in the case of a D. C., or said switch may connect the instrument with the circuit over the rectifier 18 in order to rectify an A. C. before taking the measurement. Where the rectifier is formed by a section of the diode of the electronic tube 14 the connection must be modified accordingly.

The switch 50 comprises two arms 50a, 50b either connected as shown in Figure 3, or one of which shifts the battery connection of the instrument to the plate of the diode section 51 of the tube 14, while the second arm 50b closes the filament circuit of the tube. An A. C. voltage applied to the test terminals or jacks 56, 57, Figure 2, or 34, 56 or 57 respectively, Figure 3, is therefore rectified before reaching the instrument.

The test oscillator and signal tracer arrangement is best seen on the right of Figure 3. The signal generator is formed by means of the tube 14, which may be a tube 1S5, using the pentode section of the tube. The connections are essentially those of a Hartley oscillator. Two coils 60 and 61 are used in order to cover two different frequency ranges, for instance intermediate frequencies used in a superheterodyne receiver and the broadcast frequencies. A small variable condenser 63 may be used in connection with one of the coils, the selection of the coil being made by a double pole switch 65.

Both coils are center tapped, the center being connected with a dry cell B battery 66 of a suitable voltage.

The frequency range of the low frequency coil within the circuit shown by the variable condenser 63 is so selected that the circuit containing the coil and condenser may be tuned to frequencies corresponding to the customary I. F. frequencies of heterodyne receivers.

The grid and plate connections of the tube 14 are controlled by a further switch 75 while the circuit of the filament 58, as already described, may be controlled by an arm of switch 50 as shown in Figure 2 or by a separate switch 78.

If the tube 14 is used as an oscillator its output circuit 79 is preferably provided with a jack 81 one contact of which may be grounded at the battery ground while the tip contact is connected with the output circuit of the oscillator. The terminal of the radio apparatus to be tested after having been connected with suitable plug connectors is inserted into the jack 81. The high tension necessary for testing is provided by the vibrator secondary which connected with the cathode circuit upon closing of switch 29.

For signal tracing purposes the circuit of grid 82 of tube 14 may be connected, by means of switch 75, with a jack 84 into which plug 85 of test prod 88 may be inserted.

No special modulation means are necessary to produce an audible signal. Preferably the value of the grid capacity and grid leak are so chosen that blocking of the oscillation occurs at an audible rate.

The oscillation produced in the tube may be detected by means of crystal rectifier 20 connected with the jack 84 upon closing of switch 77. Switch 77 is shown on the panel in Figure 1 in the left hand corner of the panel. Alternatively the diode of the tube 14 may be used for detection, if a second rectifier 18 is provided, so that the diode is not used for rectifying purposes. The test prod 88 may merely consist of the prod pin 89 mounted in a metallic casing 90 which is connected with the grounded terminal by means of the sleeve of the plug 85. A suitable condenser 91 may be provided in the prod 88.

The plate circuit 95 of the tube 14 which is closed when the second arm of the switch 75 is shifted to the signal tracing position, marked S. T. in the figures, is provided with a jack 97 for the earphone set 96 by means of which the signal is traced.

In addition the instrument may be provided with a flashlight bulb 93 used for continuity tests. The flashlight bulb 93 is preferably connected with contact m of switch 40 on one hand and with the battery 35, 35a on the other hand.

Prods placed into the jacks 34, 57 for instance are therefore placed in series with the battery and with the flashlight bulb. The continuity of the circuit may thus be tested. This continuity test is useful in some cases of circuit testing and is widely used when repairing shorted condensers.

The handling of the instrument for testing and measuring purposes will be apparent from the above specification. The number of testing or measuring operations which can be carried out with this relatively small instrument unit which is also of a very moderate weight is markedly larger than the number of operations which can be carried out with known single instruments of comparable weight and size. The operation of the instrument is nevertheless more or less completely mechanical, in so far as it can be handled by following definite rules and the electrician may proceed according to these rules in those cases in which testing is necessary in order to check a set or to find faults the nature or location of which is unknown. It will be clear from the above that changes of an unessential nature will not form a departure from the invention as claimed in the annexed claims.

Having described the invention what is claimed as new is:

1. A measuring and testing assembly for testing radio and television sets, comprising an instrument box, a milliammeter provided with a multimeter scale, two ganged switches each provided with a movable contact arm and with a contact bank, said contact arms moving in conjunction over their banks for connecting corresponding contacts on the banks with the contact arms, terminal contacts for a connection with the sets to be tested, one of the terminal contacts being connected with the movable contact arm of the first one of the ganged switches, resistances for measuring voltages on the multimeter scale milliammeter, connected with some contacts on the contact bank of the first one of the two ganged switches, said resistances being connected with a conductor leading to one side of the multimeter scale milliammeter and with a conductor leading to the movable contact arm of the second one of the ganged switches, a variable resistance connected with the source of current and with one bank contact of the first one of the ganged switches, a further terminal contact for connection with the set to be tested, connected with a conductor leading to the multimeter scale milliammeter for measuring ohmic resistances in the circuits of the set to be tested when connected with said further terminal contact, further resistances connected with contacts of the contact bank of the second one of the two ganged switches and connected with a conductor leading to the multimeter scale milliammeter, the corresponding contacts of the contact bank of the first one of the ganged switches being connected with the movable arm of the second one of the ganged switches and with one of the conductors leading to the multimeter scale milliammeter, said further resistances providing means for measuring the current intensity of currents sent through the set to be tested, a rectifier connected with conductors leading to the multimeter scale milliammeter and switching means inserted into the connections between said milliammeter and said rectifier, selectively making either a direct connection with the conductors leading to the milliammeter or making a connection with the milliammeter through the said rectifier.

2. A measuring and testing assembly for testing radio and television sets comprising an electronic oscillator tube, with electrodes including a cathode, an anode and an intermediate grid electrode, a plurality of oscillator circuits connectable with said electrodes, said oscillator circuits being formed by multiple circuit branches, alternatively connectable with the oscillator tube electrodes, coils of different inductance in the said multiple circuit branches, each coil containing branch being connectable with a circuit branch containing a variable condenser, so as to form with the said condenser an oscillation circuit, tunable to a frequency range differing from that obtainable with another coil, center tappings on said coils and a circuit branch joining said alternatively connectable multiple circuit branches and being connected with the said center tappings, said last named joining branch closing the oscillator circuit of the oscillator tube when connected with one of the multiple branches and connecting the latter with the cathode of the electronic tube, a source of current in said last named joining branch, means for connecting the said last named joining branch with a set to be tested, means for rhythmically interrupting the oscillations in the oscillator tube, a vibrator connected with the cathode circuit, a test probe and means for connecting the test probe with the grid and cathode of said electronic tube, a further oscillator circuit branch connectable with the anode and containing a telephonic set, a crystal detector connected with the test probe, a further connector means for connecting a circuit in the set to be tested with a vibrator.

3. A measuring and testing assembly for radio and television sets, comprising an instrument box having a front panel, a multiammeter with a multimeter scale arranged on the front panel, a series of contacts on said front panel connected with fixed and adjustable resistances, said resistances being connected with said multiammeter, a switch arm on said front panel cooperating with the said series of contacts, test circuit connector means on said front panel, for attaching connecting conductors leading to circuits to be tested, connected with said switch arm, a source of direct currents connected with several contacts connected with the fixed and adjustable resistances, a vibrator, connected with said source of direct currents and with a further contact of the series of contacts and with one of the test circuit connector means, a visual indicator on said front panel in said last named connection, an electronic tube provided with an anode, cathode and grid and with a grounded cathode circuit, a grid circuit and a plurality of alternatively connectable output circuits, connectable with the anode, means for producing oscillations in the electronic tube, means for detecting circuit interruptions of audible frequency produced in the electronic tube, a test prod connectable with the grounded cathode circuit and one of the output circuits to be brought into contact with one of the circuits to be tested which circuit is also connected over one of the test circuit connector means with the vibrator, an earphone set for detecting audible frequencies connected with the tube circuit with which the test prod is connected, and a second one of the output circuits connectible with the electronic tube being provided with means for connecting it with the set to be tested, the instrument thus being equipped for testing the complete set in working condition, as well as any of its circuits and also measuring current intensity, resistance and voltage in the different circuits of the set with which it is connected.

4. A measuring and testing assembly for radio and television sets as claimed in claim 3 wherein two series of contacts connected with resistances are arranged, each series being grouped around a rotatable switch arm, the two switch arms being ganged, one of said switch arms being connected with the milliammeter and the other switch arm being connected with one of the test circuit connector means, one of the contacts of the series arranged around the last named switch arm being connected with the circuit of the source of direct currents, said connection containing a further visual signal for a direct current continuity test.

5. A measuring and testing assembly for radio and television sets, comprising an electronic tube provided with an anode, a cathode and a plurality of grids, grid and anode connections, and a cathode circuit for said electronic tube, a plurality of center tapped coils alternatively connectible with the grid and anode connections of the electronic tube, one of said coils being adapted to produce frequencies in the radio frequency range and the other coil being adapted to produce frequencies in the intermediate frequency range, the connection between said coils and the grid and anode connection of the electronic tube being produced by an oscillation circuit section containing an adjustable condenser, switching means for alternatively connecting the oscillation circuit section containing the condenser with one of said coils, further switching means for connecting the grid and anode connections of the electronic tube alternatively with the said last named oscillation circuit section and with signal tracer circuit sections, respectively, means for producing an audible interruption of the oscillations produced by the electronic tube, one of said signal tracer circuit sections including a connector, a test prod insertable into said connector, another signal tracer circuit section containing a further connector, a receiver of audible oscillations insertable into said further connector, said measuring and testing assembly thus producing test frequencies for radio and intermediate frequency apparatus testing and audible frequencies for signal tracing purposes.

6. A measuring and testing assembly for radio and television sets as claimed in claim 5 wherein the coils which are both center tapped, are joined at their center tappings and are further joined with a connection leading to a source of anode currents, and wherein a connector is arranged between the connections leading to the center tappings and the cathode circuit, said connector being adapted for a connection with the radio or television set to be tested.

7. A measuring and testing assembly for radio and television sets as claimed in claim 5 wherein a rectifying detector is connected with a portion of the signal tracer circuit leading to the connector adapted to be connected with the test prod.

8. A measuring and testing assembly for radio and television sets as claimed in claim 5 wherein the electronic tube is a multiple function tube including a diode the latter being used as a rectifier connected with a section of the signal tracer circuit leading to the test prod connector.

9. A measuring and testing assembly for radio and television sets as claimed in claim 5 comprising in addition a self-interrupting vibrator connected with a cathode circuit and producing rhythmic interruptions in the connection connected with the cathode circuit.

10. A measuring and testing assembly as claimed in claim 5 wherein a combined multiammeter and voltmeter combined with a rectifier is provided for measuring the output of the apparatus connected with the anode and cathode circuit of the electronic tube.

11. A measuring and testing assembly for radio and television sets as claimed in claim 5 wherein the electronic tube is a multifunction tube including a diode and comprising in addition a combined multiammeter and voltmeter provided with a multimeter scale and further provided with a plurality of contact sets having terminal contacts for connection with sets to be tested, and further contacts connected with resistances to be included in the test circuit, a connection between the multiammeter and said diode and switches for alternatively connecting said test contacts directly with the multiammeter and voltmeter and with a diode of the electronic tube for rectifying alternating currents to be measured by the combined multiammeter and voltmeter.

References Cited in the file of this patent

UNITED STATES PATENTS

| | | |
|---|---|---|
| 1,811,319 | Johnson | June 23, 1931 |
| 1,911,362 | Hickok | May 30, 1933 |
| 1,954,311 | Fausett | Apr. 10, 1934 |
| 1,959,592 | Macadie | May 22, 1934 |
| 1,986,414 | Saunders | Jan. 1, 1935 |
| 2,007,992 | Wenger | July 16, 1935 |
| 2,011,941 | Snider | Aug. 20, 1935 |
| 2,030,857 | Dingley | Feb. 18, 1936 |
| 2,121,434 | Klinedinst et al. | June 21, 1938 |
| 2,265,637 | Ferris | Dec. 9, 1941 |
| 2,450,872 | Aiken | Oct. 12, 1948 |
| 2,455,543 | Williams | Dec. 7, 1948 |
| 2,475,649 | Teetsell | July 12, 1949 |
| 2,499,410 | Nupp | Mar. 7, 1950 |
| 2,550,787 | Dedman | May 1, 1951 |
| 2,558,282 | Triplett | June 26, 1951 |